United States Patent
Schrey et al.

(10) Patent No.: US 7,283,167 B1
(45) Date of Patent: Oct. 16, 2007

(54) METHOD AND DEVICE FOR READING OUT IMAGE DATA OF A SUB-RANGE OF AN IMAGE

(75) Inventors: Olaf Schrey, Ratingen (DE); Michael Schanz, Oberhausen (DE); Werner Brockherde, Duisburg (DE); Bedrich Hosticka, Duisburg (DE)

(73) Assignee: THOMSON Licensing SAS (FR)

( * ) Notice: Subject to any disclaimer, the term of this patent is extended or adjusted under 35 U.S.C. 154(b) by 0 days.

(21) Appl. No.: 10/220,547

(22) PCT Filed: Mar. 1, 2000

(86) PCT No.: PCT/EP00/01771

§ 371 (c)(1),
(2), (4) Date: Jan. 22, 2003

(87) PCT Pub. No.: WO01/65829

PCT Pub. Date: Sep. 7, 2001

(51) Int. Cl.
*H04N 3/14* (2006.01)

(52) U.S. Cl. .................................................... 348/308

(58) Field of Classification Search ................ 348/294, 348/296, 302–305, 308
See application file for complete search history.

(56) References Cited

U.S. PATENT DOCUMENTS

| | | | |
|---|---|---|---|
| 5,262,871 A | 11/1993 | Wilder et al. | |
| 5,541,654 A * | 7/1996 | Roberts | 348/301 |
| 5,841,126 A | 11/1998 | Fossum et al. | |
| 6,509,927 B1 * | 1/2003 | Prater et al. | 348/222.1 |
| 6,630,957 B1 * | 10/2003 | Kuroda et al. | 348/296 |
| 6,888,568 B1 * | 5/2005 | Neter | 348/222.1 |
| 7,057,655 B1 * | 6/2006 | Masuyama | 348/302 |

FOREIGN PATENT DOCUMENTS

| | | |
|---|---|---|
| DE | 37 44 128 A | 7/1989 |
| EP | 0 527 004 A | 7/1992 |
| EP | 0 809 395 A | 5/1997 |

\* cited by examiner

*Primary Examiner*—Vivek Srivasta
*Assistant Examiner*—Timothy J Henn
(74) *Attorney, Agent, or Firm*—Beyer Weaver LLP (57) ABSTRACT

A device for reading out image data of a sub-range of an image captured by an image sensor is described, the image sensor including a plurality of image sensor elements which can be read out by an activation signal sequentially appliable to same according to a predetermined clock signal, wherein the image sensor elements outputting the image data for the sub-range can be determined by means of an activation pattern. The device comprises a plurality of branch blocks connected in series storing the activation pattern, wherein each of the branch blocks, depending on the activation pattern, applies the activation signal received to one or several image sensor elements associated with a branch block or passes same on to a subsequent branch block or a terminating element. The activation pattern is stored in the branch blocks substantially simultaneously to the activation signal. No delay or latency times, respectively, occur in the sensor readout.

9 Claims, 6 Drawing Sheets

| set_group_row<br>set_group_col | in_row<br>in_col | prev_group_row<br>prev_group_col | rowsel<0><br>colsel<0> | next_group_row<br>next_group_col |
|---|---|---|---|---|
| 0 | 0 | 0 | 0 | 1 |
| 0 | 0 | 1 | 0 | 1 |
| 0 | 1 | 0 | 0 | 1 |
| 0 | 1 | 1 | 0 | 1 |
| 1 | 0 | 0 | 1 | 0 |
| 1 | 0 | 1 | 1 | 0 |
| 1 | 1 | 0 | 1 | 0 |
| 1 (illegal state) | 1 (illegal state) | 1 (illegal state) | 1 | 0 |

METHOD AND DEVICE FOR READING OUT IMAGE DATA OF A SUB-RANGE OF AN IMAGE

BACKGROUND OF THE INVENTION

1. Field of the Invention

The present invention relates to a method and a device for reading out image data of a sub-range of an image, and to an image sensor including such a device. More precisely, the present invention relates to a method and a device for reading out image data of a sub-range of an image which is detected by an image sensor including a plurality of image sensor elements which can be read out by means of an activation signal sequentially appliable to the image sensor elements according to a predetermined clock signal.

2. Description of Prior Art

Modern industrial and consumer image capturing systems require evermore special image capturing algorithms and image processing algorithms designed for the respective application, wherein it is desirable in some cases to read out sub-ranges within an image with, compared to the usual image rate, multiple speed. Examples of application for this are:

- inspection and arrangement systems which, after an initialization and aligning phase, must only read out sub-regions of the entire image and continue to process same,
- monitoring tasks in automotive systems, such as, for example, motor vehicle indoor identification, anti-theft and road identification systems, and
- high-speed, object tracking and target tracking systems.

Figure 7:
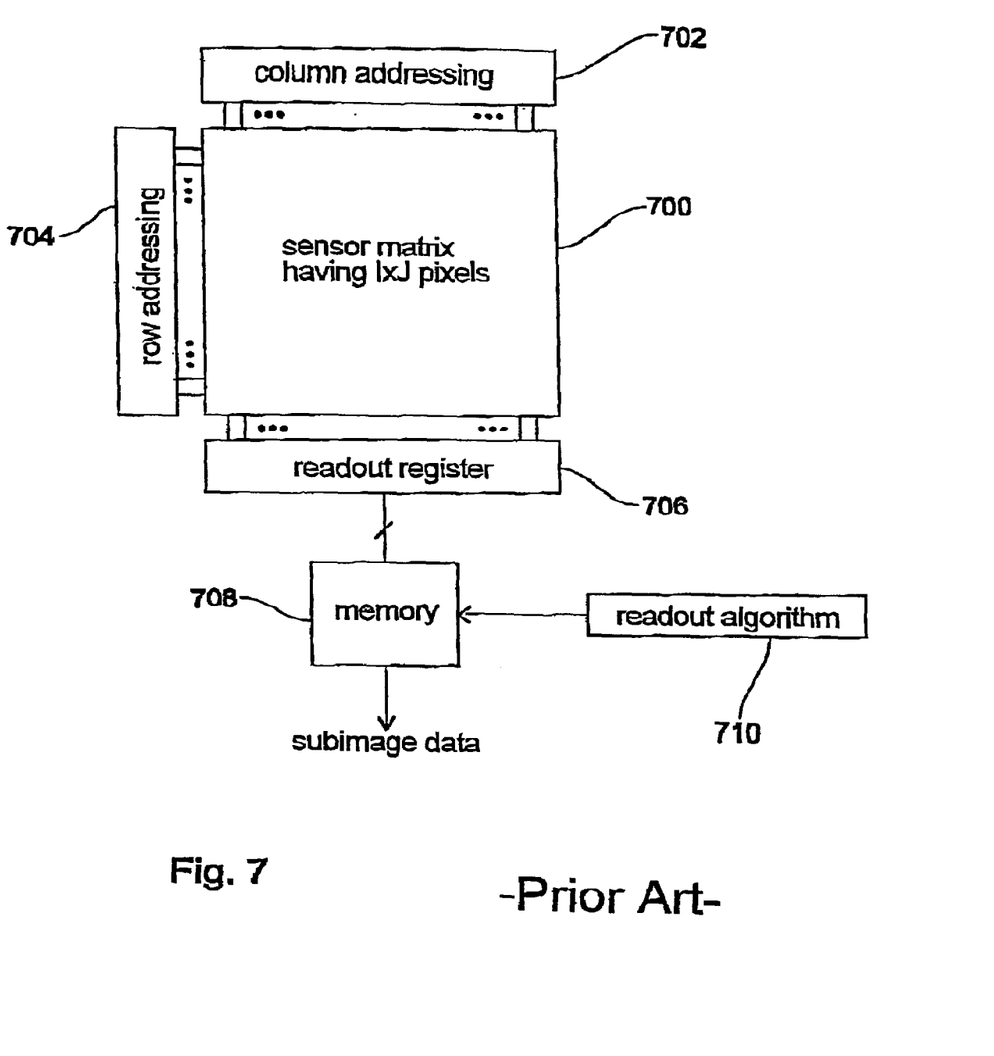
FIG. 7 shows a conventional image sensor for reading out sub-image data.

A conventional system allowing the readout of a sub-range of an image is illustrated referring to FIG. 7. This system includes an image sensor matrix 700 including a plurality of image sensor elements being arranged in rows and columns and defining image elements (pixel). The sensor arrangement shown in FIG. 7 includes a sensor matrix including I rows and J columns, wherein I, J≧1. Via corresponding addressing elements 702 and 704, for example by applying an activation signal sequentially applied to the individual image sensor signals for the columns and rows, respectively, according to a clock signal, the entire sensor content is shifted into the readout register 706 and from there to a memory 708. By means of a readout algorithm 710, the desired sub-image data is then read out of the entire image store in the memory 708 for a subsequent production of the sub-image.

In the fields of application mentioned above, there is a large need for reconfigurable image processing systems reducing the bandwidth of the image sensor output signal to the transmission bandwidth required. Since in image processing, especially in high-resolution image sensors, a huge mass of image data accumulates, the regional readout, i.e. the illustration of sub-areas of an image of interest, leads to significant increases in performance of the entire system, since the transmission bandwidth is reduced at an increasing information content, such as, for example, in high-speed post-tracking applications, or at a constant information content (such as, for example, in a multiple regional readout).

Existing image capturing systems, similar to that described referring to FIG. 7, for being in control of the requirements mentioned above, require the external image memory 708 and the intelligent readout algorithm 710 causing the memory content to be read out with the desired window mask. The disadvantage of this arrangement is that in this case the bandwidth cannot be reduced by means of the existing image sensors, since the entire image including the regions of a disappearing information content always has to be read out due to the predetermined sensor readout architecture.

In addition, additional latency times (waiting periods) rendering the entire system slow, are produced by latch-registering the image, which is one reason for the fact that high speed requirements cannot be met with this.

If possible at all, realizing one of the functionalities described above with a system as is described referring to FIG. 7 is only possible at considerable costs.

EP 0 809 395 A2 describes an x-y addressable pixel sensor in which it is possible to limit the image output to an array of the pixel sensor and, by the resulting reduction of image pixels to be output per image output, to increase the image rate of the pixel sensor. In a first embodiment, the pixel sensor, apart from the actual x-y addressable pixel array, includes two serial shift registers for indicating the row address or column address, respectively, and a row or column address control, respectively, for controlling the two serial shift registers. The address controls enable initializing the serial shaft registers by writing a digital one at any position within the shift registers. From this position on, the shift registers only shift the digital one to a position in which the defined window range to be read out ends. In a second embodiment, it is described that the pixel sensor, apart from the actual x-y addressable pixel array, includes the two serial shift registers and additionally a row or column enable switch, respectively. In contrast to the first embodiment, the serial shift registers pass all the rows or columns, respectively, of the pixel array. The two enable switches are, however, designed to load a predetermined sequence of digital ones to enable respective rows and columns corresponding to the image array to be output.

U.S. Pat. 5,641,126 describes a single chip pixel sensor having a pixel array controlled by electronics on the chip, a timing and controlling circuit controlling the row electronics and column electronics of the pixel array. The row and column electronics, respectively, include latch memories, counters and decoders. The timing and controlling circuit, via the latch memories, inputs an initializing value into the counters defining the starting position of an array to be read out. The counters then go through adjacent values one after the other departing from the initialization value. The values in the counters are the row and column addresses of the current pixel to be read out. By counting the increments and decrements of the counters and resetting the value in the counters via the ledge memories, an array to be read out can be read out similarly to as has been the case in the first embodiment of the document previously mentioned.

DE 3744128 A1 describes a method and a circuitry for a programmed driving of CCD and photodiodes matrix arrays to allow recording only sub-ranges of an image of interest. The circuitry includes a CPU and a memory, the CPU writing channel programs including a row of channel blocks into the memory. A DMA controller transfers the channel blocks from the memory into channel registers in which a camera control word and a number with which the camera control word is to be transferred repeatedly are stored. Upstream of the semiconductor array included in the circuitry, there is a suitable logic device to adapt the control signals to the respective timing requirements of the semiconductor array. Consequently, a complicated logic device is used in the circuitry to allow that a programmable readout of the semiconductor array can be performed.

U.S. Pat. No. 526,871 describes an image sensor with a pixel array comprising a device for directly addressing individual pixels and a device for selectively varying the number of pixels which can be read out at any read cycle. In this way, the image sensor allows adjusting several resolutions by summarizing pixels to super pixels and further allows sampling the image in any way, similarly to the performance of the human eye when sampling the visual field. In the image sensor, the readout of the pixels is performed directly.

EP 0527004 A1 describes an image recording device having an image sensor, such as, for example, a CCD or MOS type array, a vertical sampling circuit, a horizontal sampling circuit, an output unit and a driver circuit. The selection of a window to be read out along a row, in the image recording device, is obtained by the fact that the driver circuit, in the horizontal sampling circuit, produces start and end synchronization pulses indicating from where to where in a row the analog signal is to be sampled. For a selection of the rows of the output window, the content of which is to be output, the vertical sampling circuit is formed as shift register, which contains a bit sequence indicating which rows are released for outputting. The driver circuit can offset the shift register of the vertical sampling circuit in a suitable starting state, the release sequence releasing subsequent rows one after the other until the output window has been read out completely.

SUMMARY OF THE INVENTION

It is the object of the present invention to provide an improved method and an improved device for reading out image data of a sub-range of an image, which, by simple capturing system when reading out sub-ranges, wherein at the same time waiting periods or latency times, respectively, are reduced.

In accordance with a first aspect of the present invention this is achieved by a method of reading out image data of a sub-range of an image captured by an image sensor, the image sensor including a plurality of image sensor elements which can be read out by an activation signal applied to the image sensor elements according to a predetermined clock signal by means of branch blocks. The method comprises storing an activation pattern determining the image sensor elements outputting the image data for the sub-range and applying the activation signal to the image sensor elements of the image sensor depending on the activation pattern stored. The activation pattern is stored in the branch blocks substantially simultaneously to the activation signal.

In accordance with a second aspect of the present invention this is achieved by a device for reading out image data for a sub-range of an image captured by an image sensor, the image sensor including a plurality of image sensor elements which can be read out by an activation signal sequentially appliable to same according to a predetermined clock signal, wherein the image sensor elements outputting the image data for the sub-range can be determined by means of an activation pattern. The device comprises a plurality of branch blocks connected in series storing the activation pattern, wherein each of the branch blocks depending on the activation pattern, applies the activation signal received to one or several image sensor elements associated with a branch block or passes same on to a subsequent branch block or passes same on to a subsequent branch block or a terminating element. The activation pattern is stored in the branch blocks substantially simultaneously to the activation signal.

The present invention provides a method and a device allowing a programmable regional readout, i.e. readout of image data of a sub-range of an entire image, using a shift register based readout concept. In contrast to CCD sensor systems available on the market, but also in contrast to existing CMOS image sensors, this readout architecture has the advantage that it requires considerably less space in the image matrix periphery wherein, due to a 100% pipe lining (100% parallelism) of the charging cycle of the window schemes, no delay or latency times, respectively, occur in the sensor readout.

A further advantage of the present invention is that the two advantages just mentioned can never be obtained simultaneously in the decoder based solutions (see FIG. 7) since, for the current readout and the readout window scheme, a respective separate decoder with a considerably higher demand of space is required than is the case in the inventive shift register based solution.

Another advantage is that, as far as the criteria of latency time and space demand are concerned, the readout concept underlying the present invention represents a decisive technological advance compared to existing technological realizations.

According to a preferred embodiment, the image sensor elements are arranged in rows and columns and the activation patterns and the activation signals for the image sensor elements of the rows and the image sensor elements of the columns are stored and applied separately. In addition, the branched blocks in this case include a plurality of row branch blocks connected in series and a plurality of column branch blocks connected in series.

According to a further preferred embodiment of the present invention, a part of the activation pattern for the image sensor element associated with the branch block is stored in the branch blocks to which one or several image sensor elements are assigned. At the input of a branch block, the activation signal is received either from the input of the image sensor or from a previous branch block, wherein, depending on the part of the activation pattern stored in the pattern block, it is determined and stored whether the image sensor elements associated with the branch block are associated with the sub-range to be read out. Via a branch logic circuit, the activation signal is applied to the image sensor elements of the branch block and passed on to a subsequent branch block, if the image sensor elements associated with the branch block are associated with the sub-range to be read out, or the activation signal is passed on to a subsequent branch block without being applied to the image sensor elements of the branch block, if the image sensor elements associated with the branch block are not associated with the sub-range to be read out.

A plurality of sub-ranges can also be determined by means of the activation pattern. In addition, the activation pattern can be stored or filed in a memory, respectively, substantially parallel to the activation signal or prior to it.

According to a further aspect of the present invention, an image sensor with a plurality of image sensor elements which can be read out by an activation signal sequentially appliable to same according to a clock signal is provided. This image sensor further includes the inventive device for reading out a sub-image from the image sensor, the device preferably being integrally arranged in a marginal region of the image sensor.

BRIEF DESCRIPTION OF THE DRAWINGS

Preferred embodiments of the present invention will be detailed subsequently referring to the appended drawings, in which:

FIG. 1 shows a schematic illustration of an image sensor which the inventive device is associated with;

DESCRIPTION OF PREFERRED EMBODIMENTS OF THE INVENTION

Figure 1:
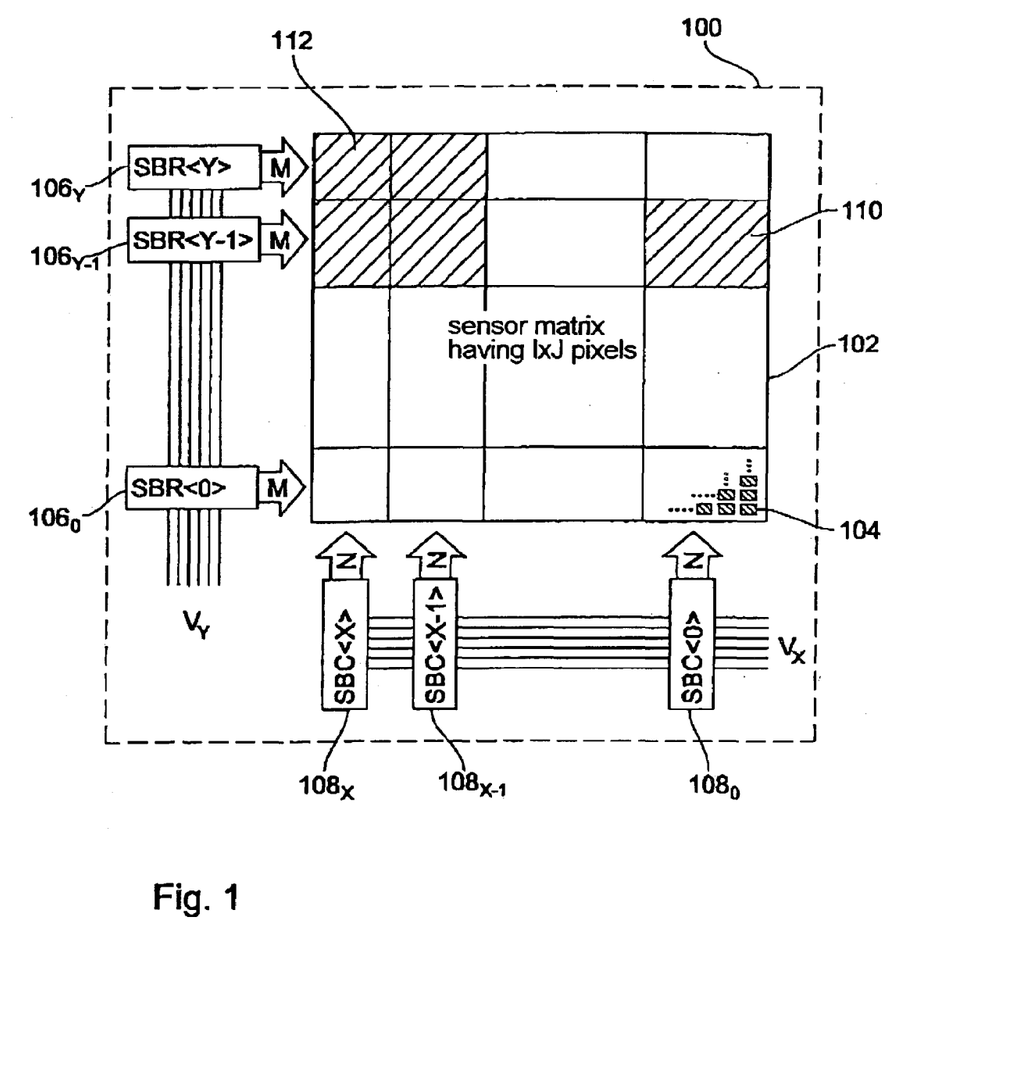

An image sensor 100 is schematically illustrated in FIG. 1. The image sensor 100 includes a sensor matrix 102 including a plurality of image sensor elements 104, of which, for reasons of clarity, only a few are illustrated in FIG. 1. The sensor matrix 102 basically has the same architecture as a conventional sensor matrix, as has been described, for example, referring to FIG. 7. The image sensor elements 104 (pixels) of the sensor matrix 102 are arranged in I rows and J columns, wherein I, J$\geq$1. In the context of the present invention, driving the individual image sensor elements 104 is of interest so that, for reasons of clarity, the readout rows are not illustrated in FIG. 1.

In the embodiment shown in FIG. 1, a plurality of row branch blocks (SBR <0> to SBR <U>) $106_o$ to $106_Y$ are arranged which are connected in series to one another via a plurality of driving lines $V_Y$. As is illustrated by the arrows associated with the individual row branch blocks $106_o$ to $106_Y$, a predetermined number of M rows of the sensor matrix 102 are associated with the respective branch blocks. A plurality of column branch blocks (SBS<0> to SBC <X>) $108_o$ to $108_x$ are provided which are connected in series to one another by driving lines $V_x$. Similarly to the row branch blocks $106_o$ to $106_Y$, columns of the sensor matrix 102 are associated with the column branch blocks $108_o$ to $108_x$, as is illustrated by the arrows associated with the individual column branch blocks.

For the sensor matrix 102 having I×J image sensors elements 104 (pixels), 1$\leq$M, N$\leq$I, J applies, the number of branch blocks $106_o$ to $106_Y$ in the sensor matrix 102 having a resolution of I×J pixels being between 1 and Y, wherein Y can equal I. The number of column branch blocks $108_o$ to $108_x$ is also between 1 and X, wherein X can equal J.

The inventive device and the inventive method allow the selective readout of sub-regions, such as, for example, the sub-regions 110 and 112, which are illustrated in FIG. 1 in a hatched manner, instead of the complete readout of the sensor matrix 102.

In order to ensure that only the image data associated with the respective ranges 110 and 112 is read out, the image sensor 100 has to be configured to determine the image sensor elements 104 of interest, of which is to be read out. Thus, when configuring the image sensor 100 for the example shown in FIG. 1, it is determined that, via the branch blocks $106_{Y-1}$ and $106_Y$ and the branch blocks $108_{x-1}$ and $108_x$, corresponding driving signals for reading out the corresponding image sensor elements are applied, whereby image data corresponding to the sub-image or sub-image 112, respectively, is read out. It is also determined that corresponding activation signals are applied to the image elements providing data for the sub-region 110, which is effected by a corresponding storage of the activation pattern in the branch blocks $106_{Y-1}$ and $108_o$. For the other image sensor elements not being associated with the sub-region 110,112, applying an activation signal is prevented by determining in the correspondingly associated branch blocks that these image sensor elements are to be skipped wherein this is effected by a branch logic described hereinafter causing, in the case that image sensor elements associated with the branch blocks are not to be driven, the activation signal to be passed by them to the next branch block.

According to the present invention, the readout pattern (signal "skipping_pattern") is preferably loaded into the branch blocks parallel to the actual readout process. In another embodiment, the readout patterns can also be stored in advance.

Although an equal number of image sensor element columns is associated with the column branch blocks in the embodiment shown in FIG. 1 and, in the same way, a respective equal number of image sensor element rows is associated with the row branch blocks, it is to be noted that configurations in which a respective different number of image sensor element column is associated with the column branch blocks and an also different number of image sensor element rows is associated with the row branch blocks are possible. It can be seen in FIG. 1 that a basic sub-range can be determined by a row branch block and a column branch block, in this case range 110, wherein in the example shown in FIG. 1, in which all the row branch blocks and all the column branch blocks are associated with an equal number of image elements, image ranges of interest to be read out can be determined by one or several adjacent basic sub-regions.

It is also to be pointed out that, instead of the determination of two sub-regions shown in FIG. 1, more or less sub-regions having different sizes can be determined.

Figure 2:
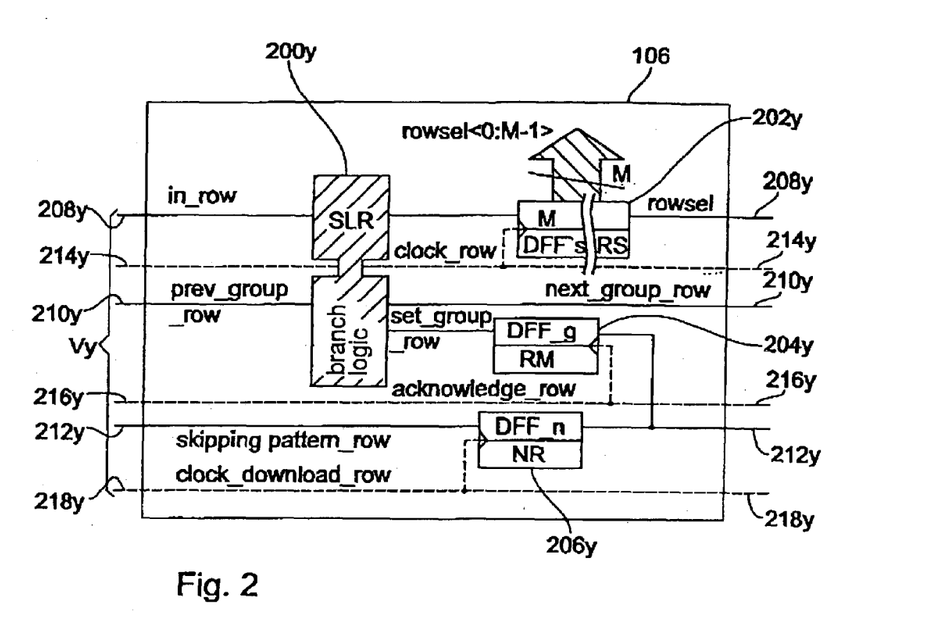
FIG. 2 shows a schematic illustration of a row branch block of the inventive device.
Figure 3:
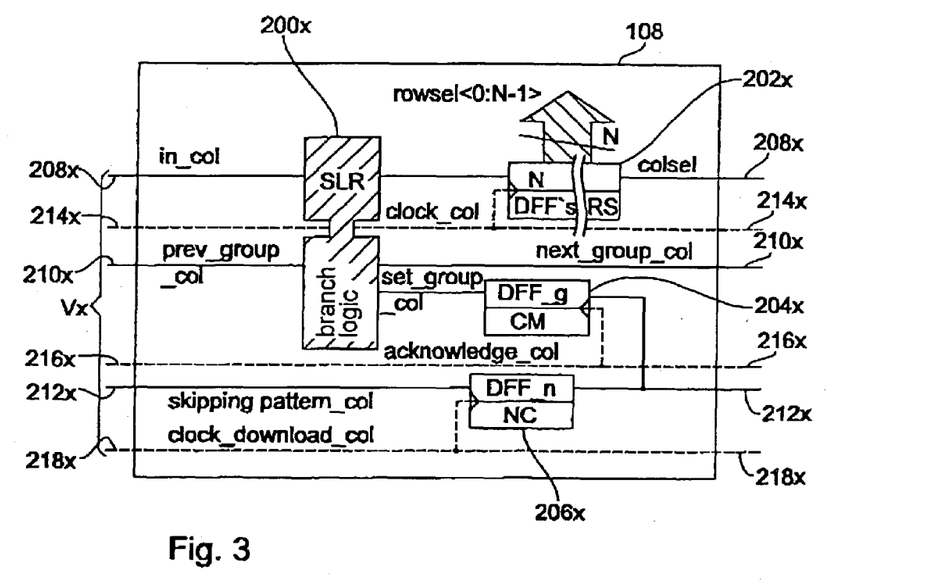
FIG. 3 shows a schematic illustration of a column branch block of the inventive device.

A preferred embodiment of a row branch block and a column branch block, respectively, will be detailed referring to FIGS. 2 and 3.

All the branch blocks have the same architecture and the branch block 106 shown in FIG. 2 is one of the row branch blocks shown in FIG. 1. It is connected in series to previous or subsequent branch blocks via the driving line $V_x$ or, if it is the first branch block, receives the input driving signals and is connected to the next branch block at its output. If it is the last of the branch blocks, it receives the control signals from the previous branch blocks at its input and is connected to a terminating element at its output. The branch block 106 includes a branch logic $200_Y$, an address register $202_Y$ for the rows associated with the branch block 106, a row memory register (RM) $204_Y$ and a row register (NR) $206_Y$.

The driving lines $V_Y$ include six individual lines, three signal lines $208_Y$, $210_Y$ and $212_Y$ and three activation lines $214_Y$, $216_Y$ and $218_Y$.

The clock line $214_Y$ serves to activate the row address register $202_Y$, the clock line $216_Y$ serves to activate the row memory register $204_Y$ and the clock line $218_Y$ serves to activate the row register $206_Y$, as is shown by the corresponding connections between the respective clock lines $214_Y$ to $218_Y$ and the respective activating inputs of the registers $202_Y$ to $206_Y$ formed by flip-flops. The data signal line $208_Y$ is connected to an input of the branch logic $200_Y$, the data line $210_Y$ is connected to a further input of the branch logic and the data line $212_Y$ is connected to an input of the row register $206_Y$. The output of the row register $206_Y$ is connected to an input of the row memory register $204_Y$, the ouput of which is connected to a further input of the branch logic $200_Y$. The branch logic $200_Y$ includes a first input connected to an input of the row address register $202_Y$ and a second input connected to an output line of the branch block 106. Depending on the signals applying at the inputs of the branch blocks $200_Y$, corresponding output signals are provided at the two output lines. At the output of the branch block 106, the six driving lines $208_Y$ to $218_Y$ are present again.

The column branch block 108 shown in FIG. 3 basically has an identical architecture as block 106 described in FIG. 2, so that another description is omitted. To illustrate that this is the column branch block, the same reference numerals, but having the index X, are used for the description of the individual elements. In addition, the corresponding registers $202_X$ to $206_X$ are the column address register (CS), the column memory register (CM) and the row register (NC), respectively. In addition, the signals to be described hereinafter are provided with the designation "col" instead of the designation "row" (in FIG. 2).

The mode of operation of the inventive device will now be detailed referring to the branch blocks exemplarily illustrated in FIGS. 2 and 3. The region of interest to be read out or the regions 110, 112 (see FIG. 1) of interest to be read out, respectively, are selected via the respective column branch blocks and row branch blocks in the embodiment illustrated, wherein it is determined in blocks 106 and 108 via the respective one row register (NR) $206_Y$ and the one column register (NC) $206_X$ whether the image sensor elements associated with a branch block produce image data for the sub-range of the image to be displayed. The registers NR, NC are arranged at the image matrix periphery. The signals "skipping_pattern_row" and "skipping_pattern_col" are applied to the lines $212_Y$ and $212_X$. It is determined by the signal "skipping_pattern", which of the column branch blocks and the row branch blocks, respectively, are associated with the sub-range. Put differently, it is determined by the signal "skipping_pattern", which of the branch blocks cause an activation signal to be applied to the image sensor elements of this branch block. The setting takes place in a configuration step prior to the actual readout or, preferably, parallel or substantially parallel to applying the activation signal (=clocked passing of the activation signals to the individual branch blocks). The signal "skipping_pattern" indicates for all the branch blocks whether they are associated with the sub-ranges or not. The signal "skipping_pattern_row" and the signal "skipping_pattern_col" are shifted into the row registers NR and column registers NC, respectively, of the respective branch blocks with the shift clocks "clock_download_row" and "clock_download_col" present on the lines $218_Y$ and $218_X$. After the activation or skipping pattern in the individual branch blocks in the row registers and column registers $206_x$, $206_y$ has been determined, the signal stored in these registers (flip-flops) is taken over into the row memory register 204Y and the column memory register $204_x$, respectively, at a defined point in time, i.e. the signals stored in the row and column registers are taken over into the row memory register and the column memory register, respectively, with the clock signal "acknowledge_row" and "acknowledge_col", respectively, present on the clock line $216_Y$, $216_X$. The one bit output signals of the memories flip-flops RM and CM represent the information indicating which row and column address block, respectively, is valid for a readout (logic 1) and which is skipped (logic 0).

The image sensor 100 (see FIG. 1) is read out via the row address register (RS) $202_Y$ and the column address register (CS) $202_X$ responsive to the clock "clock_row" and "clock_col", respectively, present at the clock lines $214_Y$ and $214_X$. Thus, the row address register RS or the column address register CS, respectively, is connected to the decision or branch logic SLR or SLC which, depending on the output signals of the row memory register $204_Y$ or the columns memory register $204_X$, respectively, (signals "set_group_row", "set_group_col") determines which image elements or pixels are read out and which are skipped.

The readout of the image sensor 100 is effected by applying an activation or start signal in the form of a logic 1 to the line $208_Y$ ("in_row") of the first branch block $106_o$ (see FIG. 1) for the row based addressing, and in the form of a logic 1 to the line $208_X$ ("in_col") of the first column branch block $108_o$ (see FIG. 1) for the column based addressing. The branch blocks illustrated in FIGS. 2 and 3 are connected in series, as has been illustrated in FIG. 1. Each branch block addresses a block of N or M image elements/pixels, respectively, $1 \leq M$, $M \leq I$, J. In a matrix 102 (FIG. 1) having a resolution of I×J pixels, thus the number of row branch blocks can be between 1 . . . I and the number of column branch blocks can be between 1 . . . J.

By the series connection of the branch blocks, the following signal identities results:

"in_row$_x$"="rowsel$_{x-1}$",

"in_col$_y$"="colsel$_{Y-1}$",

"prev_group_row$_x$"="next_group_row$_{X-1}$", and

"prev_group_col$_y$"="next_group_col$_{Y-1}$".

The logic 1 (signals "in_row" or "in_col", respectively) present on the signal lines $208_Y$ and $208_X$ is then clocked by the row or column branch blocks (SBR, SBC), respectively, depending on the clock signal "clock_row" or "clock_col", respectively. Depending on the state of the signals "set_group_row" and "set_group_col", respectively, the signal "in_row" or the signal "in_col" is applied to the input of the row address register $202_X$ of the column address register $202_X$, respectively, or branched to the output line as the signal "next_group_row" or "next_group_col", respectively.

The branch block SBR or SBC, respectively, (see FIG. 1) following in series now receives a logic 1 either as its input $208_Y/208_X$ ("in_row"/"in_col") or at its line $210_Y$, $201_X$ ("prev_group_row"/"prev_group_col"). In this subsequent branch block, the query or branch routine repeats itself depending on the status signal "set_group_row" or "set_group_col", respectively, set in the current block. The output signals of the decision logic $200_Y$, $200_X$ are branched to the readout registers $202_Y$, $202_X$ and the respective subsequent branch blocks via "next_group_row" and "next_group_col", respectively, according to the clock signal "clock_row" and "clock_col", respectively. This process is repeated until the image sensor 100 is reset by an asynchronous reset signal. The decision logic SLR or SLC, respectively, can work both asynchronously and synchronously with the clock "clock_row" and/or "clock_col".

Figure 4:
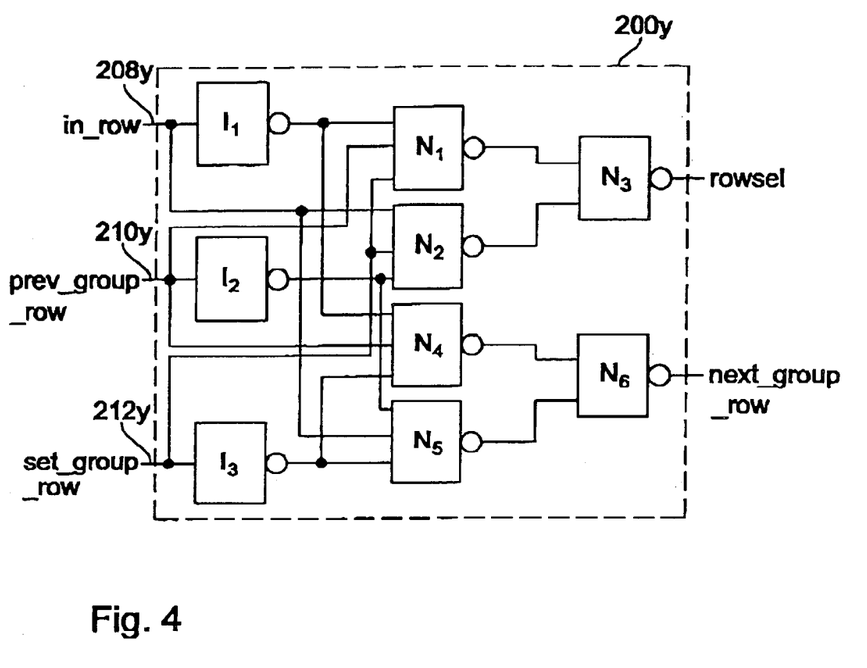
FIG. 4 shows a circuit diagram of the branch logic for the branch blocks illustrated in FIGS. 2 and 3.

FIG. 4 shows an embodiment of the branch logic $200_Y$ of the row branch logic 106, wherein it is pointed out that the branch logic in the row branch blocks can have an identical architecture. As has already been described, the branch logic $200_Y$ receives three input signals, namely the input signal $208_Y$ ("in_row"), the input signal $210_Y$ ("prev_group_row")

and the input signal $212_Y$ ("set_group_row"). The branch logic $200_Y$ includes three inverters $I_1$ to $I_3$ and six NAND gates $N_1$ to $N_6$.

The inverter $I_1$ receives the input signal $208_Y$ and passes the inverted input signal $208_X$ to an input of the NAND gates $N_1$ and $N_4$. The non-inverted input signal $208_Y$ is present at an input of the NAND gates $N_2$ and $N_5$. The input signal $210_Y$ is fed to the inverter $I_2$, the output of which is present at an input of the NAND gates $N_2$ and $N_5$. The non-inverted input signal $210_Y$ is applied to an input of the NAND gates $N_1$ and $N_4$. The input signal $212_Y$ is applied to the inverter $I_3$, the output signal of which is present at an input of the NAND gates $N_4$ and $N_5$. The non-inverted input signal $212_Y$ is present at the inputs of the NAND gates $N_1$ and $N_2$.

The output signals of the NAND gates $N_1$ and $N_2$ are present at the inputs of the NAND gates $N_3$ which, at its output, outputs the signal "row_sel". The outputs of the NAND gates $N_4$ and $N_5$ are present at the inputs of the NAND gate $N_6$ outputting the signal "next_group_row".

Figure 5:
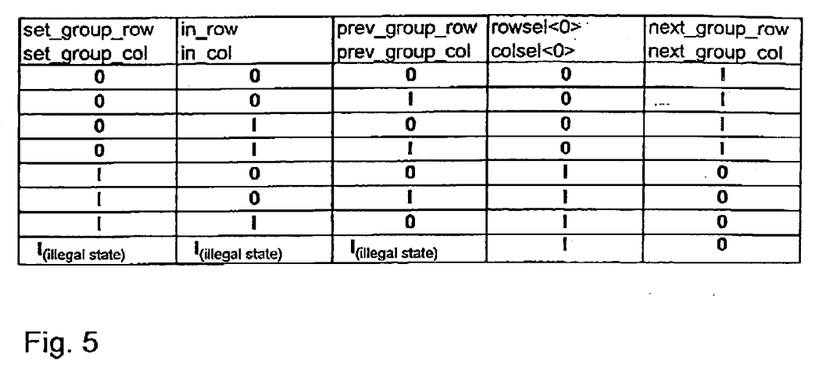
FIG. 5 shows the state transition table for the logic circuit for FIG. 4.

FIG. 5 is the state transition table for the branch logic shown in FIG. 4, which, as has been mentioned, is also contained in the column branch blocks.

The branch logic described referring to FIG. 4, can, for example, be implemented in a CMOS image sensor, wherein, as has also been mentioned, the branch blocks are identically designed for a row and column based readout. The branch logics are also designed identically. Regarding the last row of the state transition table in FIG. 5, it is to be pointed out that the "illegal states" shown there are prevented by a corresponding timing of the registers RS, RM, NR and CS, CM NC. The branch logic shown in FIG. 4 is, for example, for a row branch logic, wherein a column branch logic can be constructed in the same way, the input and output signals corresponding to the row readout signals "in_col", "prev_group_col", "set_group_col", "col_sel" and "next_group_col" mentioned before.

Figure 6:
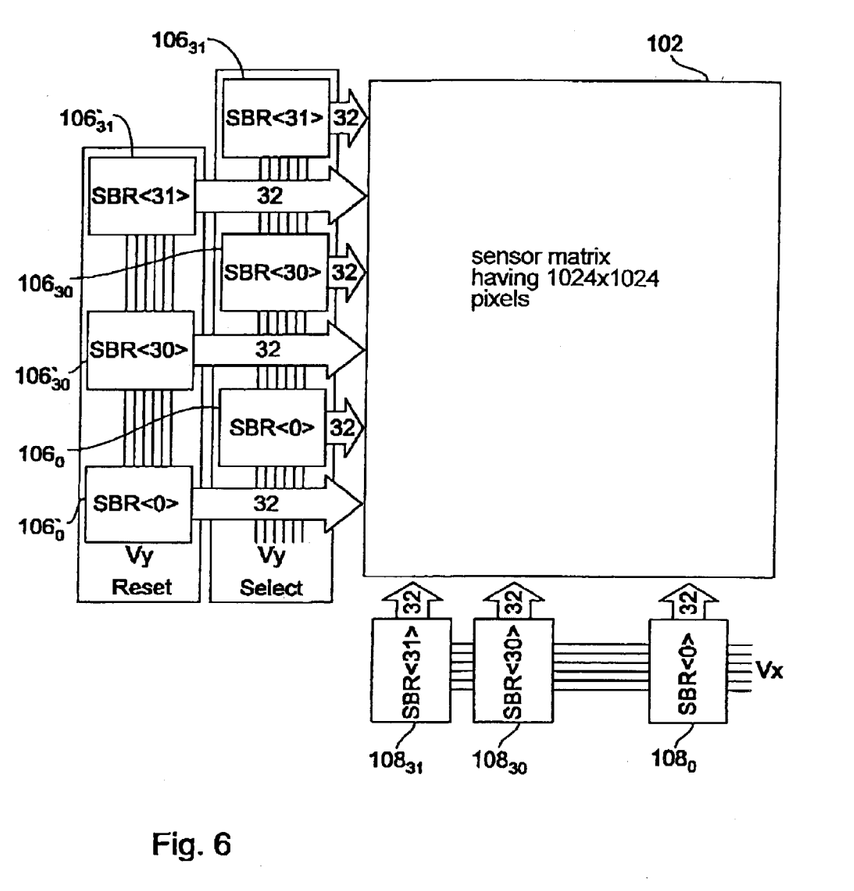
FIG. 6 shows an example of a hardware realization of a row and column based readout.

FIG. 6 shows an example of a hardware realization of an image sensor for a row and column based readout. In this realization, as can be seen, the number of branch blocks 32 is SBR blocks $106_o$ to $106_{31}$ for the row readout and 32 SBC blocks $108_o$ to $108$_for the column readout. The sensor matrix 102 has a resolution of 1024×1024 pixels and a four-channel readout scheme for the pixel output signals. The number of CS flip-flops is thus 8 flip-flops per SBC branch block. The number of RS flip-flops is 32 per SBR branch block.

In this hardware realization, additionally to the bank ("SELECT") for the row selection, a further bank ("RESET") including 32 SBR branch blocks $106'_o$ to $106'_{31}$ has been implemented in the vertical row direction, since an SBR band ("SELECT") for the row-wise readout of the pixels and a further SBR bank ("RESET") for the row-wise reset of the pixels corresponding to the "rolling-shutter" readout method are required. The 32 SBR branch blocks $106'_o$ to $106'_{31}$ of the other SBR bank ("RESET") are substantially similar to those of the SBR bank ("SELECT"). When applying an activation signal, in this case, as far as selection is concerned, a reset signal is applied to the associated image elements (depending on the readout pattern—signal "skipping-pattern").

The decisive advantage of the inventive device and the inventive method, compared to known image sensor units allowing a readout of sub-images, is that the readout pattern sequences ("skipping_pattern_row" and "skipping_pattern_col") can be loaded into the branch blocks in a fully parallel way to the actual readout process ("row_sel" or "col_sel", respectively). Due to the indpendent clocks "clock_row", "clock_download_row" and "acknowledge_row", and "clock_col", "clock_download_col" and "acknowledg_col", this can also take place considerably faster. Thus, a further consequence is that the division of the branch blocks SRB or SBC can be performed row-wise or column-wise, i.e. the registers RS and CS can be reduced to the minimum of one flip-flop. In addition, any number of rows and columns can be summarized in the respective branch block SRB or SBC, respectively, independently of each other.

The image sensor read-out scheme defined according to the present invention has a maximum of flexibility and, thus, can be implemented for any matrix resolution. In contrast, known decoder architecture always have a certain redundancy, as long as the matrix resolution is no power of 2. In addition, conventional decoder networks require considerably more space. The concept of the sensor readout scheme presented herein is, however, always optimally adapted to the respective matrix resolution.

With a minimum amount of space, the number of gates of the connection logic is in the order of magnitude of 6 to 10 and that of the shift register flip-flop in the order of magnitude of 10 to 12. Thus, there is a maximum gate number of 16 to 22 per branch block SBR, SBC. In contrast to the gate number of a conventional decoder network which, depending on the sensor resolution, is several hundreds gates, this means a decisive saving of space.

As long at it is attempted to further obtain a similarly good parallelism (pipe lining performance) with conventional decoder networks, as in the inventive concept of the branch blocks, latch registers are required, which on their own already require the amount of space of a branch block. Branch block based sensor readout architectures thus allow a complete renunciation of decoder networks at an identical parallelism (pipe lining performance).

What is claimed is:

1. A method of reading out image data of a sub-range of an image captured by an image sensor, the image sensor including a plurality of image sensor elements which can be read out by an activation signal applied to the image sensor elements according to a predetermined clock signal by means of branch blocks, comprising the following steps:

storing an activation pattern determining the image sensor elements outputting the image data for the sub-range; and applying the activation signal to the image sensor elements of the image sensor depending on the activation pattern stored, wherein the activation pattern is stored in the branch blocks substantially simultaneously to the activation signal, and wherein the image sensor includes a plurality of branch blocks, wherein one or several image sensor elements are associated with each of the branch blocks, wherein a part of the activation pattern for the image sensor elements associated with the branch block is stored in the branch blocks and wherein the step of applying for a branch block comprises the following sub-steps:

receiving the activation signal from an input of the image sensor or a previous branch block;

depending on the part of the activation pattern stored in the branch block, determining whether the image sensor elements associated with the branch block are associated with the sub-range to be read out;

if the image sensor elements associated with the branch block are associated with the sub-range to be read out, applying the activation signal to the image sensor elements of the branch block and passing on the activation signal to a subsequent branch block; and if the image sensor elements associated with the branch block are not associated with the sub-range to be read out, passing on the activation signal to a subsequent branch block without applying same to the image sensor elements of the branch block.

2. The method according to claim 1, wherein the image sensor elements are arranged in rows and columns and wherein the activation pattern for the image sensor elements of the rows and the image sensor elements of the columns is stored and applied separately and the activation signal for the image sensor elements of the rows and the image sensor elements of the columns is stored and applied separately.

3. The method according to claim 1, wherein the activation pattern determines a plurality of sub-ranges.

4. A device for reading out image data of a sub-range of an image captured by an image sensor, the image sensor including a plurality of image sensor elements which can be read out by an activation signal sequentially applicable to same according to a predetermined clock signal, wherein the image sensor elements outputting the image data for the sub-range can be determined by means of an activation pattern, comprising:

a plurality of branch blocks connected in series storing the activation pattern, wherein each of the branch blocks, depending on the activation pattern, applies the activation signal received to one or several image sensor elements associated with a branch block or passes same on to a subsequent branch block or a terminating element, wherein the activation pattern is stored in the branch blocks substantially simultaneously to the activation signal, and wherein the image sensor includes a plurality of branch blocks, wherein one or several image sensor elements are associated with each of the branch blocks, wherein a part of the activation pattern for the image sensor elements associated with the branch block is stored in the branch blocks and wherein the step of applying for a branch block comprises the following sub-steps;

receiving the activation signal from an input of the image sensor or a previous branch block;

depending on the part of the activation pattern stored in the branch block, determining whether the image sensor elements associated with the branch block are associated with the sub-range to be read out;

if the image sensor elements associated with the branch blocks are associated with the sub-range to be read out, applying the activation signal to the image sensor elements of the branch block and passing on the activation signal to a subsequent branch block; and if the image sensor elements associated with the branch block are not associated with the sub-range to be read out, passing on the activation signal to a subsequent branch block without applying same to the image sensor elements of the branch block.

5. The device according to claim 4, wherein the image sensor elements are arranged in rows and columns and the plurality of branch blocks includes a plurality of row branch blocks connected in series and a plurality of column branch blocks connected in series, wherein a part of the activation pattern for the image sensor elements associated with the branch block is stored in the branch blocks, a branch block comprising:

an input at which the activation signal from an input of the image sensor or a previous branch block is present;

a memory in which, depending on the part of the activation pattern stored in the branch block, it is stored whether the image sensor elements associated with the branch block are associated with the sub-range to be read out; and branch logic applying, if the image sensor elements associated with the branch block are associated with the sub-range to be read out, the activation signal to the image sensor elements of the branch block and to a subsequent branch block, or, if the image sensor elements associated with the branch block are not associated with the sub-range to be read out, passing on the activation signal to a subsequent branch block without applying same to the image sensor elements of the branch block.

6. The device according to claim 5, wherein the memory of the branch block is formed by a first flip-flop comprising a data output, a data input and a clock input, the branch block further comprising a second flip-flop comprising a data output, a data input and a clock input, wherein the data output of the first flip-flop is connected to the branch logic, the data output of the second flip-flop is connected to the data input of the first flip-flop and the data input of the second flip-flop of the subsequent branch block and the clock inputs of the first and second flip-flops are connected to different clock lines on which clocks are appliable independently from each other and from a clock by which the branch logic is clocked, thereby enabling shifting of the activation pattern into the second flip-flop of the branch blocks, an activation of the activation pattern by clocking the first flip-flops of the branch blocks and the passage of the activation signal through the branch blocks independently from each other.

7. The device according to claim 4, wherein the activation pattern determines a plurality of sub-ranges.

8. An image sensor having a plurality of image sensor elements, which can be read out by an activation signal sequentially applicable to same according to a clock signal, comprising:

a device according to claim 4 for reading out a sub-image from the image sensor.

9. The image sensor according to claim 8, wherein the image sensor elements are arranged in rows and columns, wherein the device for reading out is integrally arranged in a marginal region of the image sensor.

* * * * *